US010936217B2

(12) United States Patent
Yang et al.

(10) Patent No.: US 10,936,217 B2
(45) Date of Patent: Mar. 2, 2021

(54) PROVIDING VIRTUAL VOLUME FLEXIBILITY ON A STORAGE DEVICE CLUSTER

(71) Applicant: EMC IP Holding Company LLC, Hopkinton, MA (US)

(72) Inventors: Lifeng Yang, Beijing (CN); Shaoqin Gong, Beijing (CN); Yousheng Liu, Beijing (CN); Changyu Feng, Beijing (CN); Ruiyong Jia, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 82 days.

(21) Appl. No.: 16/369,408

(22) Filed: Mar. 29, 2019

(65) Prior Publication Data
US 2019/0384514 A1    Dec. 19, 2019

(30) Foreign Application Priority Data

Jun. 15, 2018   (CN) .......................... 201810622594.8

(51) Int. Cl.
*G06F 3/06* (2006.01)

(52) U.S. Cl.
CPC .......... *G06F 3/0631* (2013.01); *G06F 3/0604* (2013.01); *G06F 3/065* (2013.01); *G06F 3/0659* (2013.01); *G06F 3/0665* (2013.01); *G06F 3/0673* (2013.01)

(58) Field of Classification Search
CPC .... G06F 3/0604; G06F 3/0605; G06F 3/0607; G06F 3/0631; G06F 3/065; G06F 3/0659; G06F 3/0665; G06F 3/067; G06F 3/0673; G06F 3/0689
See application file for complete search history.

(56) References Cited

U.S. PATENT DOCUMENTS

| | | |
|---|---|---|
| 8,190,784 B1 | 5/2012 | Raizen et al. |
| 8,751,828 B1 | 6/2014 | Raizen et al. |
| 8,798,262 B1 | 8/2014 | Raizen et al. |
| 8,826,041 B1 | 9/2014 | Contreras et al. |
| 9,069,481 B1 | 6/2015 | Raizen |
| 9,160,526 B1 | 10/2015 | Raizen et al. |
| 9,787,522 B1 | 10/2017 | Contreras et al. |
| 9,983,807 B1 | 5/2018 | Tylik et al. |
| 10,146,782 B1 | 12/2018 | Bono et al. |
| 10,437,502 B2 | 10/2019 | Shadrin et al. |
| 2004/0098537 A1* | 5/2004 | Serizawa .............. G06F 3/0631 711/112 |

(Continued)

*Primary Examiner* — Larry T Mackall
(74) *Attorney, Agent, or Firm* — BainwoodHuang

(57) ABSTRACT

A storage management technique involves: receiving a request for creating a virtual volume, the request at least indicating a size and a service level of the virtual volume; in response to the request, creating the virtual volume on a first storage device; storing metadata information of the virtual volume in a local database that is accessible to the first storage device, the metadata information at least comprising identification information of the virtual volume and identification information of the first storage device; and synchronizing the metadata information to at least one second storage device. Such a technique enables more flexible creation of virtual volumes on a cluster of storage device.

20 Claims, 6 Drawing Sheets

(56) References Cited

U.S. PATENT DOCUMENTS

| | | | |
|---|---|---|---|
| 2011/0219106 A1* | 9/2011 | Wright | G06F 15/17331 709/223 |
| 2016/0173371 A1* | 6/2016 | Bays | H04L 49/602 370/389 |
| 2017/0206107 A1* | 7/2017 | Guha | G06F 3/0647 |
| 2018/0267728 A1* | 9/2018 | Booth | G06F 3/0604 |

* cited by examiner

PROVIDING VIRTUAL VOLUME FLEXIBILITY ON A STORAGE DEVICE CLUSTER

CROSS-REFERENCE TO RELATED APPLICATION(S)

This application claims priority to Chinese Patent Application No. CN201810622594.8, on file at the China National Intellectual Property Administration (CNIPA), having a filing date of Jun. 15, 2018, and having "STORAGE MANAGEMENT METHOD, ELECTRONIC DEVICE AND COMPUTER PROGRAM PRODUCT" as a title, the contents and teachings of which are herein incorporated by reference in their entirety.

FIELD

The present disclosure generally relates to the field of data replication, and more specifically, to a method, an electronic device and a computer program product for storage management.

BACKGROUND

Currently, virtual Volume (also called VVol) technology has been gradually applied to the field of data storage. A significance of introducing the concept of virtual volume is to enable the virtual machine and its corresponding disk to allocate resources at a storage side. For example, the storage side may allocates a virtual volume of a certain size from a shared storage resource pool to a user based on the user's demands, and mount the virtual volume to the virtual machine for the user to store the system and application data. By using a dedicated API interface (e.g., vSphere APIs for Storage Awareness, VASA), the storage side may sense the virtual volume and its corresponding content so that is possible to offload data service and virtual machine operations (such as snapshots, clones and so on) to the storage side, thereby simplifying the management operations at the user side.

However, the current virtual volume technology is only limited to the corresponding operation of configuring the virtual volume on a single storage device at the storage side, and does not involve clustered operations of configuring the virtual volume on a plurality of storage devices. Therefore, the current virtual volume configuration technology is not flexible and does not sufficient to meet the users' massive traffic demands.

SUMMARY

Embodiments of the present disclosure provide a method, a device and a corresponding computer program product for storage management.

In a first aspect of the present disclosure, there is provided a method for storage management. The method may include: receiving a request for creating a virtual volume, the request at least indicating a size and a service level of the virtual volume. The method may further include: in response to the request, creating the virtual volume on a first storage device. The method may further include: storing metadata information of the virtual volume in a local database that is accessible to the first storage device, the metadata information at least including identification information of the virtual volume and identification information of the first storage device. In addition, the method may further include: synchronizing the metadata information to at least one second storage device.

In some embodiments, the method may further include: in response to a service level of the first storage device degrading below a required service level of the virtual volume, migrating the virtual volume to a third storage device that is capable of providing the required service level; storing metadata information of the migrated virtual volume into a database of the third storage device, the metadata information of the migrated virtual volume at least indicating identification information of the virtual volume and identification information of the third storage device; and synchronizing the metadata information of the migrated virtual volume to a fourth storage device.

In some embodiments, the method may further include: receiving an access request for the virtual volume; and in response to the virtual volume on the first storage device being migrated, creating an access path pointing to the migrated virtual volume, based on the metadata information of the migrated virtual volume stored in the fourth storage device.

In some embodiments, the fourth storage device is one of the at least one second storage device.

In some embodiments, the method may further include: creating a protocol endpoint between the virtual volume and a management node which requests to create the virtual volume, the protocol endpoint acting as a proxy of the management node for communication with the virtual volume; storing, as the metadata information, a correspondence among identification information of the virtual volume, identification information of the protocol endpoint and identification information of the first storage device to the local database; and synchronizing the correspondence to the at least one second storage device.

In some embodiments, creating the virtual volume may include: managing the virtual volume by a first virtual controller on the first storage device; and in response to the first virtual controller stopping operation, migrating the metadata information of the virtual volume to a second virtual controller on the first storage device.

In some embodiments, synchronizing the metadata information to the at least one second storage device may include: activating a zero message queue unit in the first storage device and the second storage device, to create a communication path between the first storage device and second storage device; and transmitting the metadata information from the first storage device to the second storage device via the communication path.

In a second aspect of the present disclosure, there is provided an electronic device. The device may include: at least one processing unit; and at least one memory coupled to the at least one processing unit and storing machine-executable instructions, the instructions, when executed by the at least one processing unit, causing the electronic device to perform acts, the acts including: receiving a request for creating a virtual volume, the request at least indicating a size and a service level of the virtual volume; in response to the request, creating the virtual volume on a first storage device; storing metadata information of the virtual volume in a local database that is accessible to the first storage device, the metadata information at least including identification information of the virtual volume and identification information of the first storage device; and synchronizing the metadata information to at least one second storage device.

In a third aspect of the present disclosure, there is provided a computer program product tangibly stored on a non-transient computer readable medium and including machine executable instructions which, when executed, cause the machine to perform steps of the method according to the first aspect.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually refer to the same components.

DETAILED DESCRIPTION OF EMBODIMENTS

Figure 1:
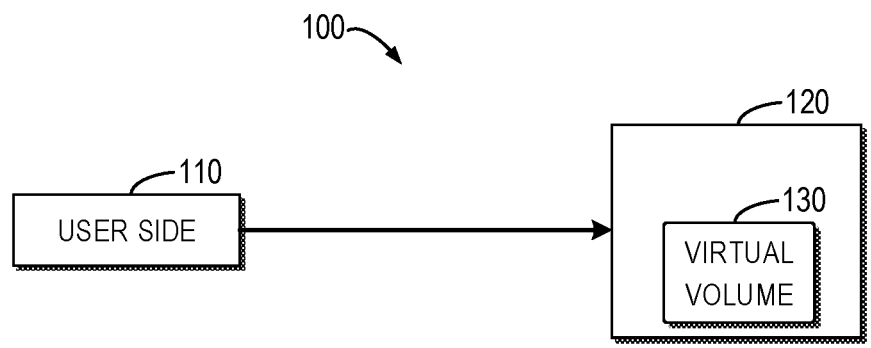
FIG. 1 illustrates a schematic diagram of an overall arrangement of a conventional storage management system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one example embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Virtual Volumes are storage entities of VMDK (virtual machine disk format) granular exported by storage arrays. At present, virtual volumes are connected to the user side host through protocol end-points (PE). The protocol endpoints are a part of the physical storage fabric, and they establish a data path from virtual machines to their respective virtual volumes on demand. Storage systems enable data services on virtual volumes. Data services, configuration and management of virtual volume systems are exclusively done out-of-band with respect to the data path. Virtual volumes may be packaged into logical entities called storage containers (SC) for management purposes. A main purpose of virtual volumes is to make storage virtualized, so as to offload the data services and virtual machine operations (such as snapshots, clones, and so on) to the storage side, and thereby simplify the management operations on the user side.

FIG. 1 illustrates a schematic diagram of an overall arrangement of a conventional storage management system 100.

As shown in FIG. 1, at present, a storage device located at a storage side 120 such as a product VNX of EMC may support a user side (or administrator side) 110 such as ESXi server or vCenter in configuring a virtual machine 130 on a single storage device. At this time, the storage side 120 is a black box relative to the user side 110, so the user side 110 needn't know a specific allocation process of the virtual machine 130. For example, the user side 110 only transmits a request such as a virtual volume size to the storage side 120, and the storage side 120 may allocate a region compliant with requirements for the user side 110 on the single storage device, so as to create the virtual volume 130. It can be seen that the user side 110 may only manage the virtual volume in the single storage device. Therefore, the user's flexibility in configuring virtual volumes on a cluster of storage device is limited.

To at least partly solve the above and other potential problems and defects, embodiments of the present disclosure provide a scheme for storage management. For the above problem, the following improvements are made to the scheme for storage management of the present disclosure: first, provide a storage device cluster having a plurality of storage devices on the storage side; in addition, to enable metadata of the created virtual volume to become global information that may be queried for by the storage device cluster, it is possible to synchronize the metadata information to other storage devices in the storage device cluster while storing the metadata information of the virtual volume into a local database.

Figure 2:
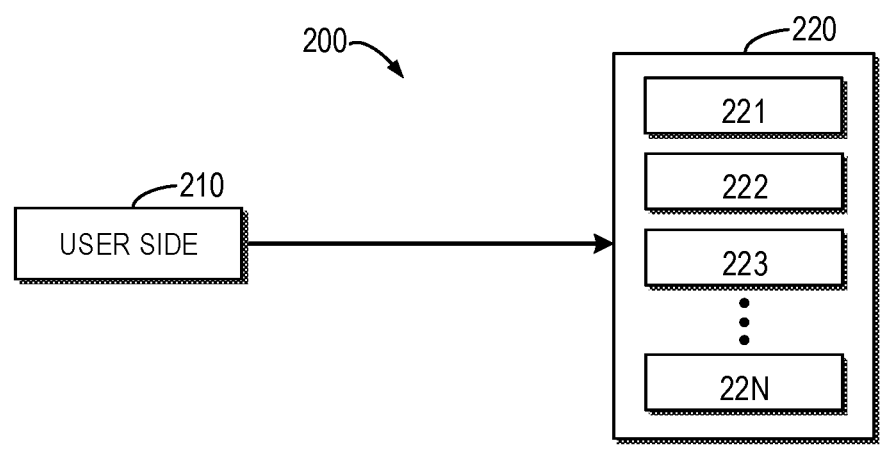
FIG. 2 illustrates a schematic diagram of an overall arrangement of a storage management system in accordance with embodiments of the present embodiments.

FIG. 2 illustrates a schematic diagram of an overall arrangement of a storage management system 200 in accordance with embodiments of the present embodiments. As shown in FIG. 2, the user side 210 may transmit to the storage side 220 a request to create a virtual volume (not shown), the request including a size required for creating the virtual volume and information about a service level. The user side 220 allocates a region for the virtual volume based on the size and the service level. As an example, when the storage device 221 has enough storage space and is capable of providing the service level, the storage side 220 may automatically create the virtual volume on the storage device 221. Then, similar to the conventional method of configuring the virtual volume, it is further required to store the metadata information of the virtual volume into a local database (such as PostgreSQL) that may be accessed to the storage device 221. However, since different storage devices cannot obtain information in the databases from each other, it is further required to globalize the metadata information of the virtual volume. That is, while storing the metadata information of the virtual volume into the local database, it is also required to synchronize the metadata information to at least one other storage device, for example, one of storage device 222 to storage device 22N. Therefore, it is possible to create the virtual volume more flexibly on the cluster of storage devices. These advantages will be discussed in detail below in conjunction with specific technical solutions.

Figure 3:
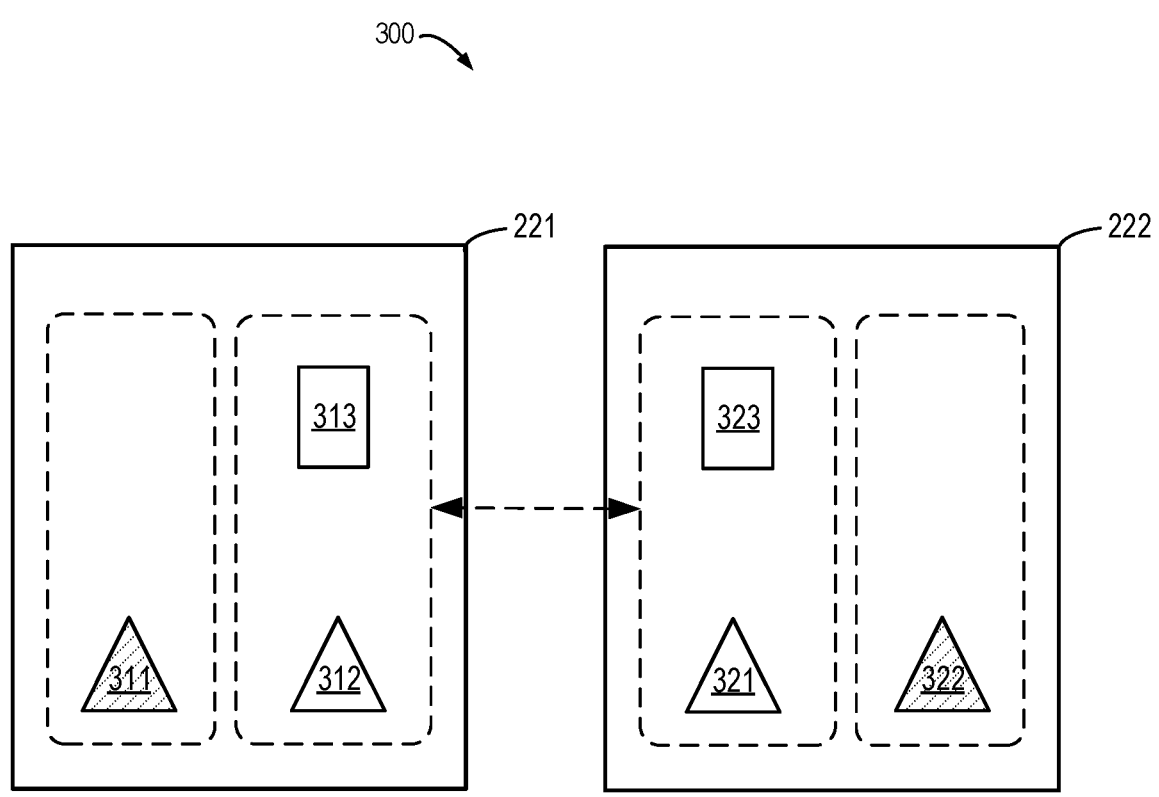
FIG. 3 illustrates a schematic diagram of detailed arrangement of a plurality of storage devices at a storage side in accordance with embodiments of the present embodiments.

FIG. 3 illustrates a schematic diagram of detailed arrangement of a storage device 310 and a storage device 320 at the storage side 300 in accordance with embodiments of the present embodiments. As shown in FIG. 3, the storage device 310 includes two virtual controllers 311 and 312 and one created virtual volume 313. The two virtual controllers 311 and 312 are used to manage the created virtual volume in the storage device 310. Similar to the storage device 310, the storage device 320 includes two virtual controllers 321 and 322 and one created virtual volume 323. The virtual controllers 321 and 322 are used to manage the created virtual volume in the storage device 320. The two virtual controllers in each storage device are both configured double alive. As shown in FIG. 3, the unshaded virtual controllers 312 and 321 are both a primary virtual controller, whereas the shaded virtual controllers 311 and 322 are both a standby virtual controller.

The storage device 310 and storage device 320 form a storage device cluster for creating the virtual volumes. Unlike the single storage device 120 in FIG. 1, a global virtual storage space (Virtual DataStore) includes a space capacity of the storage device 310 and storage device 320, and the metadata information of the virtual volume is visible for the whole global virtual storage space. A specific implementation mode which implements global visibility of the metadata information will be discussed below in detail.

Figure 4:
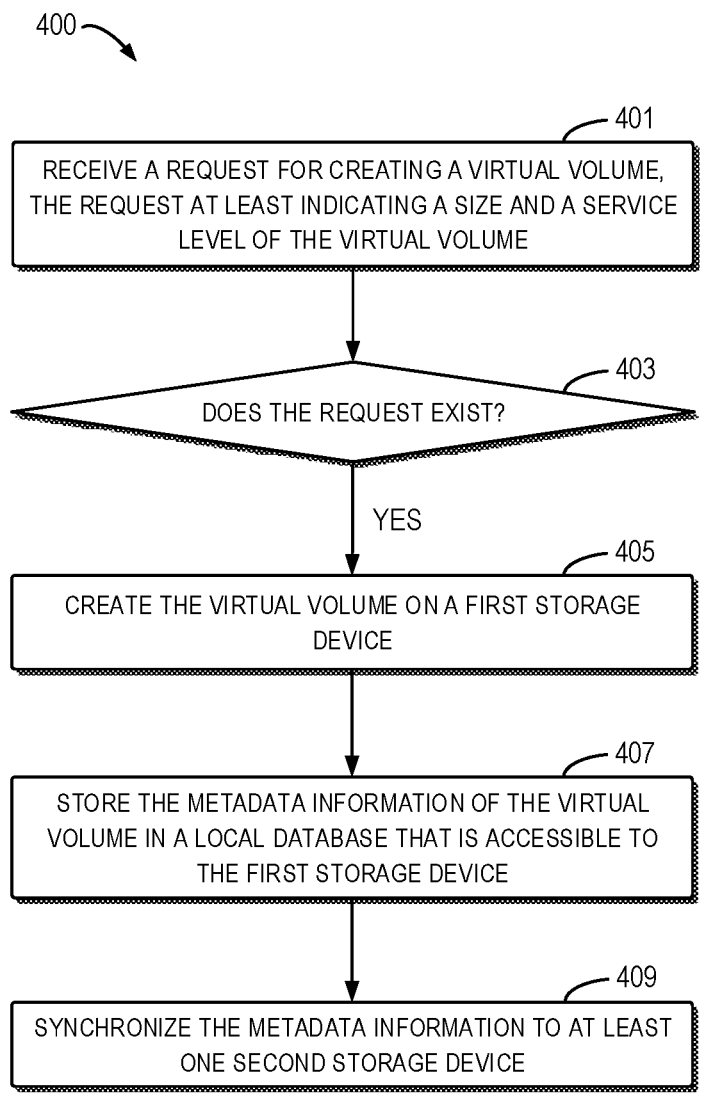
FIG. 4 illustrates a flowchart of a process or method for storage management in accordance with embodiments of the present disclosure.

FIG. 4 illustrates a flowchart of a process or method 400 for storage management in accordance with embodiments of the present disclosure. In some embodiments, the method 400 may be implemented in a device shown in FIG. 7. As an example, the method 400 may be implemented in the storage management system 200 shown in FIG. 2 or storage management system 300 shown in FIG. 3. Reference is made to FIG. 3 to describe the process or method 400 for storage management in accordance with embodiments of the present disclosure. To facilitate understanding, specific data mentioned in the following depictions all are by way of example, and used to limit the extent of protection of the present disclosure.

At 401, a request for creating a virtual volume is received, and the request at least indicates a size and a service level of the virtual volume. As an example, the service level may include a low level for ordinary users, a middle level for enterprise users and a high level for important users. As stated above, it is not necessary for the user side 210 to determine a specific position of the virtual volume to be created, and this process may be automatically completed by the storage side 220. In some embodiments, when the storage side 220 discovers that there are no storage devices that are capable of providing the size and service level for creating the virtual volume, it may report this situation to the user side 210.

At 403, it is determined if the request is received. As shown in FIG. 3, when it is determined that the request for creating the virtual volume from the user side 210 is received, the virtual volume 313 is created on the storage device 221. In some embodiments, it is possible to first find from the storage device 221 and storage device 222 a storage device for example, storage device 221 that is capable of providing the service level determined in the request, and then determine that a remaining space of the storage device 221 is larger than the size for creating the virtual volume 313, and when the remaining space of the storage device 221 is larger than the size for creating the virtual volume 313, the storage side 220 determines to create the virtual volume 313 on the storage device 221.

At 405, metadata information of the virtual volume 313 is stored in a local database that is accessible by the storage device 221. As an example, the metadata information may at least include identification information of the virtual volume 313 and identification information of the storage device 221 where the virtual volume 313 is located. Alternatively or additionally, the metadata information may further include identification information of a protocol endpoint corresponding to the virtual volume 313. In some embodiments, the local database that is accessible by the storage device 221 may be a PostgreSQL database that is maintained by the primary virtual controller 312 in the storage device 221.

At 407, the metadata information is synchronized to at least one other storage device 222. In some embodiments, it is possible to preset one storage device (e.g., storage device 222) in storage device 222 to storage device 22N in the storage side 220 of FIG. 2 as a primary storage device. After the virtual volume 313 is created, the metadata information of the virtual volume 313 may be synchronized to the storage device 222 as the primary storage device. Once other storage devices need to inquire about the metadata information of the virtual volume 313, it is possible to inquire the storage device 222 to obtain the metadata information of the virtual volume 313. Alternatively or additionally, it is also possible to synchronize the metadata information of the virtual volume 313 to all storage devices 221 to 22N of the storage side 220. By executing the above process, each storage device of the storage side 220 may obtain the metadata information of all virtual volumes created on the storage side 220.

In some embodiments, the method 400 may further include: creating a protocol endpoint between the virtual volume and a management node (namely, the user side 210) which request to create the virtual volume. The protocol endpoint acts as a proxy of the management node for communication with the virtual volume. The method 400 may further include: storing, as the metadata information, a correspondence among identification information of the virtual volume, the identification information of the protocol endpoint and the identification information of one storage device (e.g., storage device 221) to the local database as metadata information. Furthermore, the correspondence is synchronized to at least one other storage device (e.g., storage device 222). A significance of creating the protocol endpoint lies in that it may act as the proxy of the user side and communicate with the virtual volume.

In some embodiments, creating the virtual volume 313 may include: managing the virtual volume 313 by the virtual controller 312 on the storage device 221; and in response to the virtual controller 312 stopping operation, migrating the metadata information of the virtual volume 313 to the standby virtual controller 311 on the storage device 221.

In addition, a process of synchronizing the metadata information to other storage devices is described below in detail with reference to FIG. 3 again. As shown in FIG. 3, the storage device 221 and storage device 222 are communicatively connected together via a path (as shown by a dotted-line arrow). The path is established by activating an already-existing zero message queue unit (namely, ZMQ module) in the storage device 221 and an already-existing zero message queue unit in the storage device 222. Specifically, it is possible to create a synchronization module across devices in the storage device 221. The synchronization module is managed by the primary virtual controller 312 and is used to obtain the metadata information of the virtual volume from a PostgreSQL database maintained by the primary virtual controller 312. Then, the synchronization module uses the already-existing ZMQ module in the storage device 221 to communicate with the other storage device 222, and the other storage device 222 establishes a communication path based on the same principles. Such manner of establishing the communication path utilizes the already-existing communication module in the storage device, and meanwhile can achieve real-time communication between storage devices, thereby instantly updating the metadata information of respective virtual volumes.

Again as shown in FIG. 3, it is further possible to create a virtual volume 323 on the storage device 222 according a process similar to the process of creating the virtual volume 313 on the storage device 221. The virtual volume 313 and virtual volume 323 may be a group of virtual volumes that need to be used by the user side 210. In this way, it is possible to implement a process of creating a group of associated virtual volumes on a plurality of storage devices.

During long-term operation of the storage system, service levels that can be provided by the respective storage devices might change. Detailed description will be given below with reference to FIG. 5 to the storage management manner in the case that the service levels of the storage devices fall.

Figure 5:
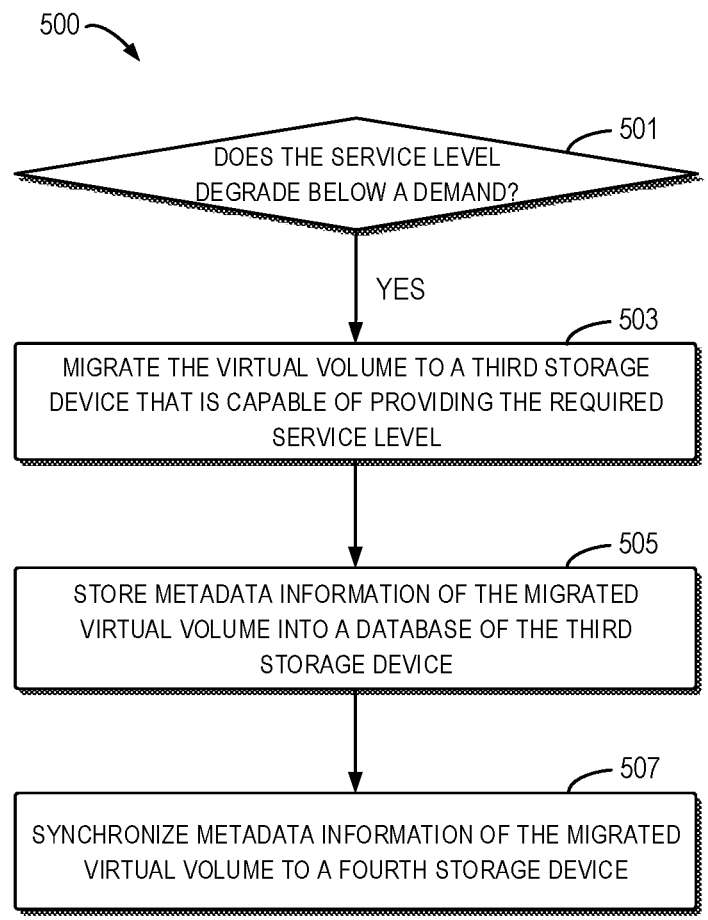
FIG. 5 illustrates a flowchart of a process or method for storage management in accordance with embodiments of the present disclosure.

FIG. 5 illustrates a flowchart of a process or method 500 for storage management in accordance with embodiments of the present disclosure. In some embodiments, the method 500 may be implemented in the device shown in FIG. 7. As an example, the method 500 may be implemented in the storage management system 200 shown in FIG. 2 or storage management system 300 shown in FIG. 3. To facilitate understanding, specific data mentioned in the following depictions all are by way of example, and used to limit the extent of protection of the present disclosure.

At 501, it is to first determined whether the service level of the storage device degrades below a required service level of the virtual volume. If yes, proceed to 503.

At 503, the virtual volume is migrated to another storage device that is capable of providing a desired service level. In some embodiments, it is possible to first find from the plurality of storage devices of the storage side 220 a storage device, e.g., storage device 223 that is capable of providing the service level determined in the request, and then determine that a remaining space of the storage device 223 is larger than the size for creating the virtual volume, and when the remaining space of the storage device 223 is larger than the size for creating the virtual volume, the storage side 220 determines creating the virtual volume on the storage device 223. Alternatively or additionally, the floating IP technology may be used to implement the service jump between storage devices.

At 505, metadata information of the migrated virtual volume is stored into a database of the storage device 223. As an example, the metadata information of the migrated virtual volume may at least indicate identification information of the virtual volume and identification information of the storage device 223 where the virtual volume is located. Alternatively or additionally, the metadata information may further include identification information of a protocol endpoint corresponding to the virtual volume. In some embodiments, the database of the storage device 223 may be a PostgreSQL database that is maintained by the primary virtual controller (not shown) in the storage device 223.

At 507, synchronize metadata information of the migrated virtual volume to the storage device 22N. In some embodiments, it is possible to preset one storage device (e.g., storage device 22N) in storage device 222 to storage device 22N in the storage side 220 as a primary storage device. After the virtual volume is created, the metadata information of the virtual volume may be synchronized to the storage device 22N as the primary storage device. Once other storage devices need to inquire about the metadata information of the virtual volume, it is possible to inquire the storage device 22N to obtain the metadata information of the virtual volume. Alternatively or additionally, it is also possible to synchronize the metadata information of the virtual volume to all storage devices 221 to 22N of the storage side 220. By executing the above process, the storage side 220 may, according to operation situations of respective storage devices 222 to 22N, adjust and maintain the storage device of a specific virtual volume, and each storage device of the storage side 220 may obtain the metadata information of all virtual volumes whose migration is completed on the storage side 220.

Figure 6:
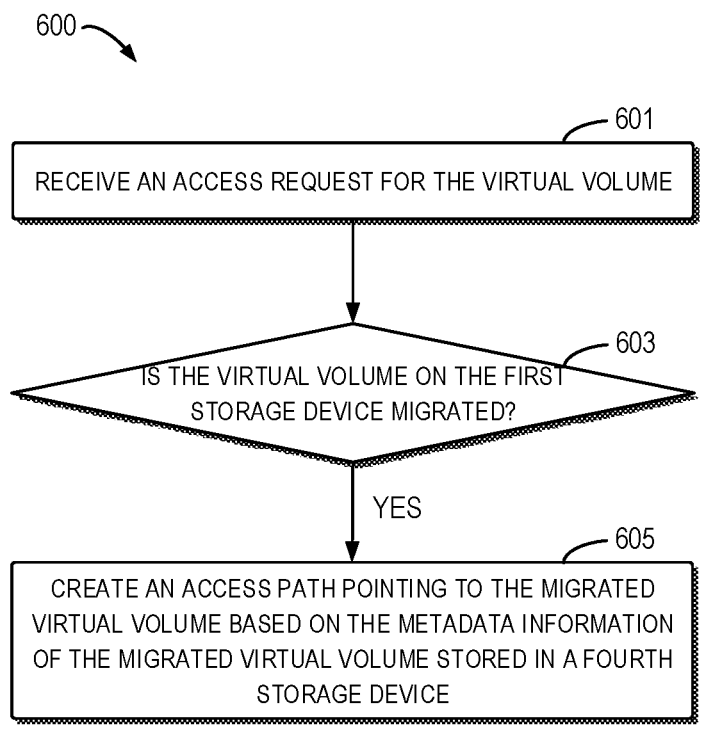
FIG. 6 illustrates a flowchart of a process or method for storage management in accordance with embodiments of the present disclosure.

In some embodiments, the user side 210 might access the virtual volumes created at the storage side 220 at any time. Reference is made below to FIG. 6 to describe a process of the storage side 220 processing the user side 210's access instruction.

FIG. 6 illustrates a flowchart of a process or method 600 for storage management in accordance with embodiments of the present disclosure. In some embodiments, the method 600 may be implemented in the device shown in FIG. 7. As an example, the method 600 may be implemented in the storage management system 200 shown in FIG. 2 or storage management system 300 shown in FIG. 3. To facilitate understanding, specific data mentioned in the following depictions all are by way of example, and used to limit the extent of protection of the present disclosure.

At 601, an access request for the virtual volume is received. At this time, since the user side 210 cannot directly obtain the metadata information of the virtual volume, the storage side 220 needs to find the metadata information of the virtual volume from a database of a primary storage device or any storage device. As an example, if the virtual volume is initially created on the storage device 221, at 603, it is determined whether the virtual volume on the storage device 221 is migrated. If yes, the process proceeds to 605. At 605, it is possible to create an access path pointing to the migrated virtual volume, based on the metadata information of the migrated virtual volume stored in for example the storage device 22N. That is, in the case that the virtual volume is migrated, it is still possible to obtain the globally-stored metadata information of the virtual volume.

Through the above process, it is possible to use the cluster of storage device to implement more flexible virtual volume configuration and thereby further simplify management operation of the user side.

Figure 7:
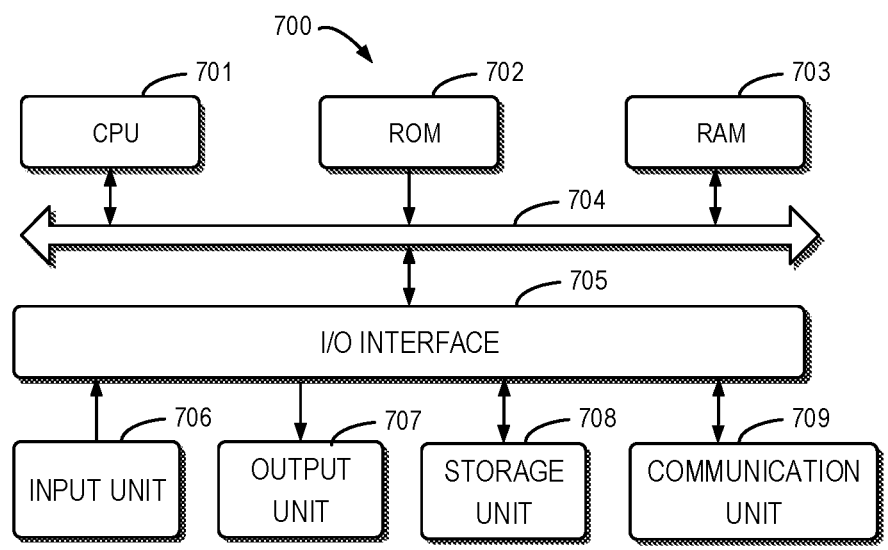
FIG. 7 illustrates a schematic block diagram of a device for storage management in accordance with embodiments of the present disclosure.

FIG. 7 illustrates a schematic block diagram of an example device 700 that may be used to implement embodiments of the present disclosure. As illustrated, the device 700 includes a central processing unit (CPU) 701 which may perform various appropriate actions and processing according to the computer program instructions stored in a read-only memory (ROM) 702 or the computer program instructions loaded from a storage unit 708 into a random access memory (RAM) 703. The RAM 703 also stores all kinds of programs and data required by operating the storage device 700. CPU 701, ROM 702 and RAM 703 are connected to each other via a bus 704, to which an input/output (I/O) interface 705 is also connected.

A plurality of components in the device 700 are connected to the I/O interface 705, including: an input unit 706, such as keyboard, mouse and the like; an output unit 707, such as various types of display, loudspeakers and the like; a storage unit 708, such as magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and processing described above, such as method 300 and/or 600, may be executed by a processing unit 701. As an example, in some embodiments, the method 300 and/or 600 may be implemented as computer software programs, which are tangibly included in a machine-readable medium, such as storage unit 708. In some embodiments, the computer program may be partially or completely loaded and/or installed to the device 700 via ROM 702 and/or the communication unit 709. When the computer program is loaded to RAM 703 and executed by CPU 701, one or more acts of the above described method 300 and/or 600 are implemented.

The present disclosure may be a method, an apparatus, a system and/or a computer program product. The computer program product can include a computer-readable storage medium loaded with computer-readable program instructions thereon for executing various aspects of the present disclosure.

The computer readable storage medium may be a tangible device capable of holding and storing instructions used by an instruction execution device. The computer readable storage medium may be, but is not limited to, for example, electronic storage devices, magnetic storage devices, optical storage devices, electromagnetic storage devices, semiconductor storage devices, or any random appropriate combination thereof. More specific examples (non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer readable program instructions described herein may be downloaded from a computer readable storage medium to various computing/processing devices, or to external computers or external storage devices via a network, for example, the Internet, a local area network, a wide area network and/or a wireless network. The network may include copper transmission cables, optical fiber transmission, wireless transmission, routers, firewalls, switches, gateway computers and/or edge servers. The network adapter or network interface in each computing/processing device receives computer readable program instructions from the network and forwards the computer readable program instructions for storage in a computer readable storage medium of each computing/processing device.

Computer readable program instructions for executing the operations of the present disclosure may be assembly instructions, instructions of instruction set architecture (ISA), machine instructions, machine dependent instructions, microcode, firmware instructions, state setting data, or either source code or destination code written by any combination of one or more programming languages including object oriented programming languages, such as Smalltalk, C++ or the like, and conventional procedural programming languages, such as the "C" programming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of method, apparatus (systems), and computer program product according to embodiments of the present disclosure. It will be understood that each block in the flow chart and/or block diagrams, and any combinations of various blocks thereof may be implemented by computer readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram.

The computer-readable program instructions may also be stored in the computer-readable storage medium. These instructions enable the computer, the programmable data processing device and/or other devices to operate in a particular way, such that the computer-readable medium storing instructions may include a manufactured article that includes instructions for implementing various aspects of the functions/actions specified in one or more blocks of the flow chart and/or block diagram.

The computer readable program instructions may also be loaded into computers, other programmable data processing devices, or other devices, so as to execute a series of operational steps on the computer, other programmable data processing devices or other devices to generate a computer implemented process. Therefore, the instructions executed on the computer, other programmable data processing devices, or other device may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method for storage management, comprising:
receiving a request for creating a virtual volume, the request at least indicating a size and a service level of the virtual volume;
in response to the request, creating the virtual volume on a first storage device;
storing metadata information of the virtual volume in a local database that is accessible to the first storage device, the metadata information at least comprising identification information of the virtual volume and identification information of the first storage device;
synchronizing the metadata information to at least one second storage device;
creating a protocol endpoint between the virtual volume and a management node which requests to create the virtual volume, the protocol endpoint acting as a proxy of the management node for communication with the virtual volume;
storing, as the metadata information, a correspondence among identification information of the virtual volume, identification information of the protocol endpoint and identification information of the first storage device to the local database; and
synchronizing the correspondence to the at least one second storage device.

2. The method according to claim 1, further comprising:
in response to a service level of the first storage device degrading below a required service level of the virtual volume, migrating the virtual volume to a third storage device that is capable of providing the required service level;
storing metadata information of the migrated virtual volume into a database of the third storage device, the metadata information of the migrated virtual volume at least indicating identification information of the virtual volume and identification information of the third storage device; and
synchronizing the metadata information of the migrated virtual volume to a fourth storage device.

3. The method according to claim 2, further comprising:
receiving an access request for the virtual volume; and
in response to the virtual volume on the first storage device being migrated, creating an access path pointing to the migrated virtual volume based on the metadata information of the migrated virtual volume stored in the fourth storage device.

4. The method according to claim 3, wherein the fourth storage device is one of the at least one second storage device.

5. The method according to claim 1, wherein creating the virtual volume comprises:
managing the virtual volume by a first virtual controller on the first storage device; and
in response to a first virtual controller stopping operation, migrating the metadata information of the virtual volume to a second virtual controller on the first storage device.

6. The method according to claim 1, wherein synchronizing the metadata information to the at least one second storage device comprises:
activating a zero message queue circuit in the first storage device and the second storage device, to create a communication path between the first storage device and second storage device; and
transmitting the metadata information from the first storage device to the second storage device via the communication path.

7. The method according to claim 1, further comprising:
forming a virtual space that includes space capacity of the first storage device and the at least one second storage device, the virtual space being user side accessible.

8. The method according to claim 7, further comprising:
providing global visibility to the metadata information of the virtual volume for the virtual space that includes space capacity of the first storage device and the at least one second storage device.

9. An electronic device, comprising:
at least one processing circuit; and
at least one memory coupled to the at least one processing circuit and storing machine-executable instructions, the instructions, when executed by the at least one processing circuit, causing the electronic device to perform acts, the acts comprising:

receiving a request for creating a virtual volume, the request at least indicating a size and a service level of the virtual volume, in response to the request, creating the virtual volume on a first storage device, storing metadata information of the virtual volume in a local database that is accessible to the first storage device, the metadata information at least comprising identification information of the virtual volume and identification information of the first storage device, synchronizing the metadata information to at least one second storage device, creating a protocol endpoint between the virtual volume and a management node which requests to create the virtual volume, the protocol endpoint acting as a proxy of the management node for communication with the virtual volume, storing as the metadata information, a correspondence among identification information of the virtual volume, identification information of the protocol endpoint and identification information of the first storage device to the local database, and synchronizing the correspondence to the at least one second storage device.

10. The electronic device according to claim 9, wherein the acts further comprise:

in response to a service level of the first storage device degrading below a required service level of the virtual volume, migrating the virtual volume to a third storage device that is capable of providing the required service level;

storing metadata information of the migrated virtual volume into a database of the third storage device, the metadata information of the migrated virtual volume at least indicating identification information of the virtual volume and identification information of the third storage device; and synchronizing the metadata information of the migrated virtual volume to a fourth storage device.

11. The electronic device according to claim 10, wherein the acts further comprise:

receiving an access request for the virtual volume; and in response to the virtual volume on the first storage device being migrated, creating an access path pointing to the migrated virtual volume, based on the metadata information of the migrated virtual volume stored in the fourth storage device.

12. The electronic device according to claim 11, wherein the fourth storage device is one of the at least one the second storage device.

13. The electronic device according to claim 9, wherein creating the virtual volume comprises:

managing the virtual volume by a first virtual controller on the first storage device; and in response to a first virtual controller stopping operation, migrating the metadata information of the virtual volume to a second virtual controller on the first storage device.

14. The electronic device according to claim 9, wherein synchronizing the metadata information to the at least one second storage device comprises:

activating a zero message queue circuit in the first storage device and the second storage device, to create a communication path between the first storage device and second storage device; and transmitting the metadata information from the first storage device to the second storage device via the communication path.

15. A computer program product having a non-transitory computer readable medium which stores a set of instructions to perform storage management; the set of instructions, when carried out by computerized circuitry, causing the computerized circuitry to perform a method of:

receiving a request for creating a virtual volume, the request at least indicating a size and a service level of the virtual volume;

in response to the request, creating the virtual volume on a first storage device;

storing metadata information of the virtual volume in a local database that is accessible to the first storage device, the metadata information at least comprising identification information of the virtual volume and identification information of the first storage device; and synchronizing the metadata information to at least one second storage device;

creating a protocol endpoint between the virtual volume and a management node which requests to create the virtual volume, the protocol endpoint acting as a proxy of the management node for communication with the virtual volume;

storing, as the metadata information, a correspondence among identification information of the virtual volume, identification information of the protocol endpoint and identification information of the first storage device to the local database; and synchronizing the correspondence to the at least one second storage device.

16. The computer program product according to claim 15, wherein the method further includes:

in response to a service level of the first storage device degrading below a required service level of the virtual volume, migrating the virtual volume to a third storage device that is capable of providing the required service level;

storing metadata information of the migrated virtual volume into a database of the third storage device, the metadata information of the migrated virtual volume at least indicating identification information of the virtual volume and identification information of the third storage device; and synchronizing the metadata information of the migrated virtual volume to a fourth storage device.

17. The computer program product according to claim 16, wherein the method further includes:

receiving an access request for the virtual volume; and in response to the virtual volume on the first storage device being migrated, creating an access path pointing to the migrated virtual volume based on the metadata information of the migrated virtual volume stored in the fourth storage device.

18. The computer program product according to claim 17, wherein the fourth storage device is one of the at least one second storage device.

19. The computer program product according to claim 15, wherein creating the virtual volume comprises:

managing the virtual volume by a first virtual controller on the first storage device; and in response to a first virtual controller stopping operation, migrating the metadata information of the virtual volume to a second virtual controller on the first storage device.

20. The computer program product according to claim 15, wherein synchronizing the metadata information to the at least one second storage device comprises:
activating a zero message queue circuit in the first storage device and the second storage device, to create a communication path between the first storage device and second storage device; and
transmitting the metadata information from the first storage device to the second storage device via the communication path.

* * * * *